United States Patent [19]

Arnold

[11] Patent Number: 4,828,042
[45] Date of Patent: May 9, 1989

[54] COULTER CHISEL TILLAGE TOOL

[75] Inventor: Loren G. Arnold, Ottawa, Ohio

[73] Assignee: Unverferth Manufacturing Company, Inc., Kalida, Ohio

[21] Appl. No.: 31,908

[22] Filed: Mar. 30, 1987

[51] Int. Cl.⁴ .............................................. A01B 61/04
[52] U.S. Cl. .................................. 172/572; 172/551; 172/178
[58] Field of Search ............... 172/178, 196, 551, 567, 172/572, 573

[56] References Cited

U.S. PATENT DOCUMENTS

| | | | |
|---|---|---|---|
| 2,210,813 | 8/1940 | Kriplean | 97/209 |
| 2,661,675 | 12/1953 | Fyke | 97/53 |
| 3,080,004 | 3/1963 | McNair | 172/587 |
| 3,275,087 | 9/1966 | Petitt | 172/572 |
| 3,451,489 | 7/1969 | Sullivan | 172/572 |
| 3,589,449 | 7/1971 | Washburn | 172/265 |
| 3,700,037 | 10/1972 | Hentrich et al. | 172/265 |
| 4,116,140 | 9/1978 | Anderson et al. | 172/572 |
| 4,187,916 | 2/1980 | Harden et al. | 172/146 |
| 4,312,409 | 1/1982 | Mills | 172/572 |
| 4,313,503 | 2/1982 | Good et al. | 172/178 |
| 4,396,070 | 8/1983 | Brandner et al. | 172/572 |
| 4,492,272 | 1/1985 | Jensen | 172/178 |
| 4,564,075 | 1/1986 | Chekouras | 172/573 |

Primary Examiner—Deborah L. Kyle
Assistant Examiner—J. Woodrow Eldred
Attorney, Agent, or Firm—Marshall & Melhorn

[57] ABSTRACT

A coulter chisel tillage tool includes a mounting apparatus for attaching a disc gang to a rockshaft. A bracket extends radially from the rockshaft and is connected to one end of a spring having its other end positioned in a retainer cup. The retainer cup is attached to one end of a rod which extends longitudinally through the spring and through an aperture formed in the mounting bracket with the other end of the rod rotatably attached to a bracket assembly. The bracket assembly includes a pair of bearing caps which rotatably engage the rockshaft and are positioned between a pair of plates which are maintained together by bolts. One of the bolts also extends through a yoke of a disc gang for rotatably mounting the disc gang for rotation about a generally vertical axis. The spring and bracket assembly permits the disc gang to rotate about the rockshaft when an obstacle is struck during normal operation.

16 Claims, 2 Drawing Sheets

COULTER CHISEL TILLAGE TOOL

BACKGROUND OF THE INVENTION

The invention relates, in general, to farm tillage implements and, in particular, to a coulter chisel tool mounting apparatus.

Tillage tools are utilized after harvest to cut and mix residue while shattering plow sole and compacted soils. A coulter chisel tool typically has a plurality of disc gangs mounted on a front of a frame for cutting stubble and mulch into the soil to allow for more rapid decay. A plurality of chisel shanks are mounted at the rear of the frame for rolling the soil to further bury the residue and improve the moisture-holding capacity of the soil.

The disc gangs typically include three or four discs attached to a subassembly which in turn is attached to the frame. Each disc gang can be mounted for rotation about a generally vertical axis to provide for continued operation and ease of turning at the end of rows. However, where the soil contains obstacles such as rocks and stumps, the disc gangs are susceptible to damage.

SUMMARY OF THE INVENTION

The present invention concerns an apparatus for mounting disc gangs on a coulter chisel frame to permit not only rotation about a vertical axis, but limited rotation about a horizontal axis to absorb the shocks imposed by hitting obstacles such as rocks and stumps. A rock shaft has a plurality of radially extending arms attached thereto. Each of the arms is attached to a spring-type shock absorber which in turn is connected to an arm rotatably mounted on the rock shaft. The arm is attached to a yoke upon which the discs are rotatably mounted. The yoke is mounted for rotation about a substantially vertical axis for turning and will rotate about the generally horizontal axis of the rock shaft against the force generated by the spring-type shock absorber when an obstacle is struck.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
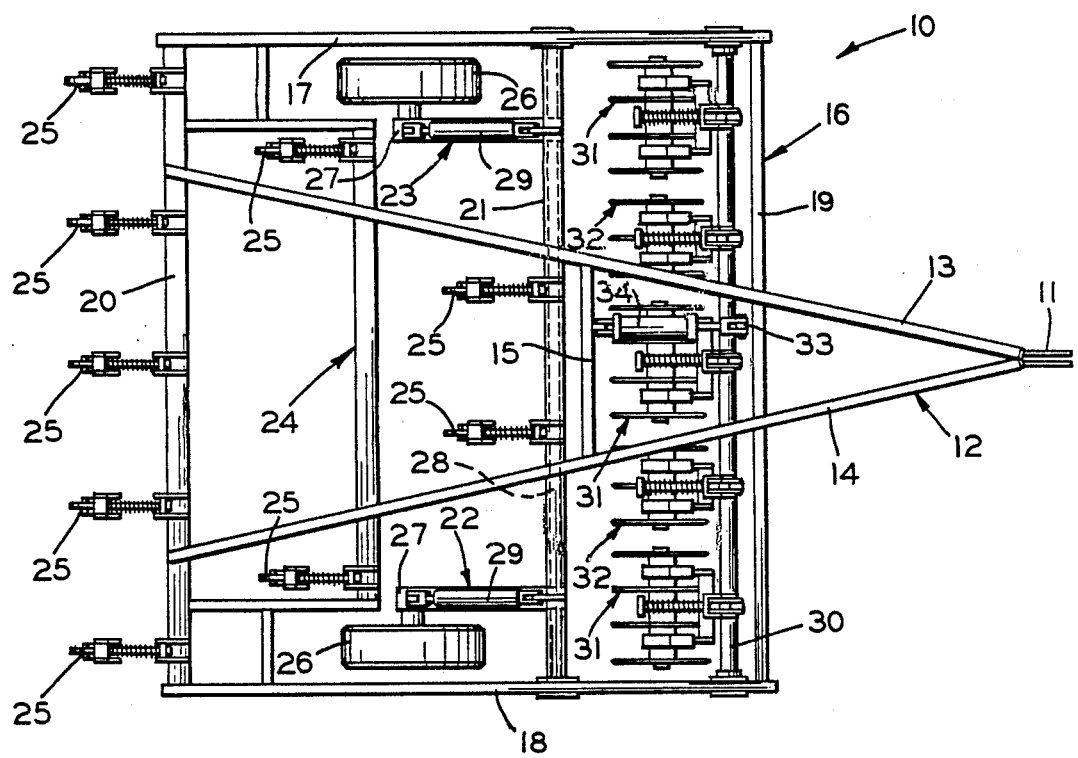
FIG. 1 is a top plan view of a coulter chisel tillage implement embodying the present invention.

A coulter chisel tillage implement 10 is shown in FIG. 1 as having a hitch 11 for connection to a tractor. The hitch 11 is attached to a point of a hitch frame 12 generally in the form of a letter "A" with legs 13 and 14 and a connecting cross bar 15. The hitch frame 12 is attached to a main frame 16 at a plurality of locations. For example, the main frame 16 includes a pair of side rails 17 and 18 maintained in generally parallel, spaced apart relation by a front cross bar 19 and a rear cross bar 20. The legs 13 and 14 can be attached to the cross bars 19 and 20 by any suitable means such as welding or mounting brackets and bolts.

An intermediate cross bar 21 extends between the side rails 17 and 18 and is attached to the legs 13 and 14. Mounted on the main frame 16 are a right wheel assembly 22 and a left wheel assembly 23. The wheel assemblies 22 and 23 are rotatably mounted as described below and each includes a hydraulic cylinder actuator for rotating the wheel assemblies about a generally horizontal axis to raise and lower the implement 10 with respect to the ground.

Attached to the side rails 17 and 18 and the rear cross bar 20 is a sub-frame assembly 24 configured to provide room for the wheel assemblies 22 and 23 to move between the side rails 17 and 18 and the inner frame assembly 24. A plurality of chisel shank assemblies 25 are attached to the rear cross bar 20, the intermediate cross bar 21 and the inner frame assembly 24. The chisel shank assemblies 25 are conventional and include a chisel shank with point and one of several mounting variations. For example, a rigid mounting is used for soils free of rocks and stumps, sheer bold mounting for soils with occasional obstacles, or spring cushioned for use in soils with rocks and stumps. When the chisel shanks are spring cushioned, they are provided with a mounting which permits them to rotate about a generally horizontal axis and a biasing spring oriented in a generally downward direction to force the chisel points into the soil and absorb any shock upon hitting an obstacle.

Each wheel assembly 22 and 23 includes a wheel 26 rotatably mounted at one end of an arm 27. Each arm 27 is attached to a rockshaft 28 which is rotatably mounted between the side rails 17 and 18 below the intermediate cross bar 21. Each wheel assembly 22 and 23 also includes a hydraulic cylinder 29 rotatably attached to the end of the arm 27 to which the wheel 26 is attached and rotatably attached at its other end to the intermediate cross bar 21. Thus, when the hydraulic cylinders 29 are actuated, the arms 27 are rotated in unison with the rockshaft 28.

A second rockshaft 30 is rotatably mounted between the side rails 17 and 18 and is positioned adjacent the front cross bar 19. A plurality of disc gangs 31 and 32 are mounted on the second rockshaft 30. The disc gangs 31 have four discs mounted thereon and the disc gangs 231 have three discs mounted thereon. The disc gangs 31 and 32 are similar in construction and only the disc gang 31 will be discussed in detail below. The second rockshaft 30 is attached to one end of a generally radially extending arm 33. A hydraulic cylinder 34 has one end rotatably attached to the cross bar 15 and an opposite end rotatably attached to the outer end of the arm 33. Thus, when the hydraulic cylinder 34 is actuated, the rockshaft 30 is rotated.

Figure 2:
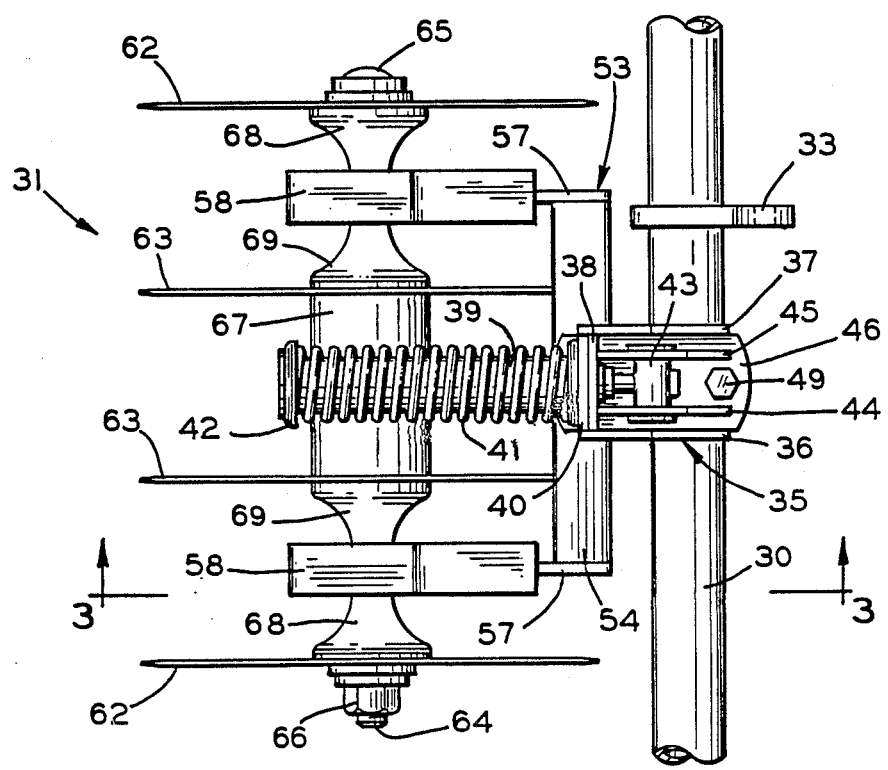
FIG. 2 is as enlarged top plan view of one of the disc gangs of the implement of FIG. 1.
Figure 3:
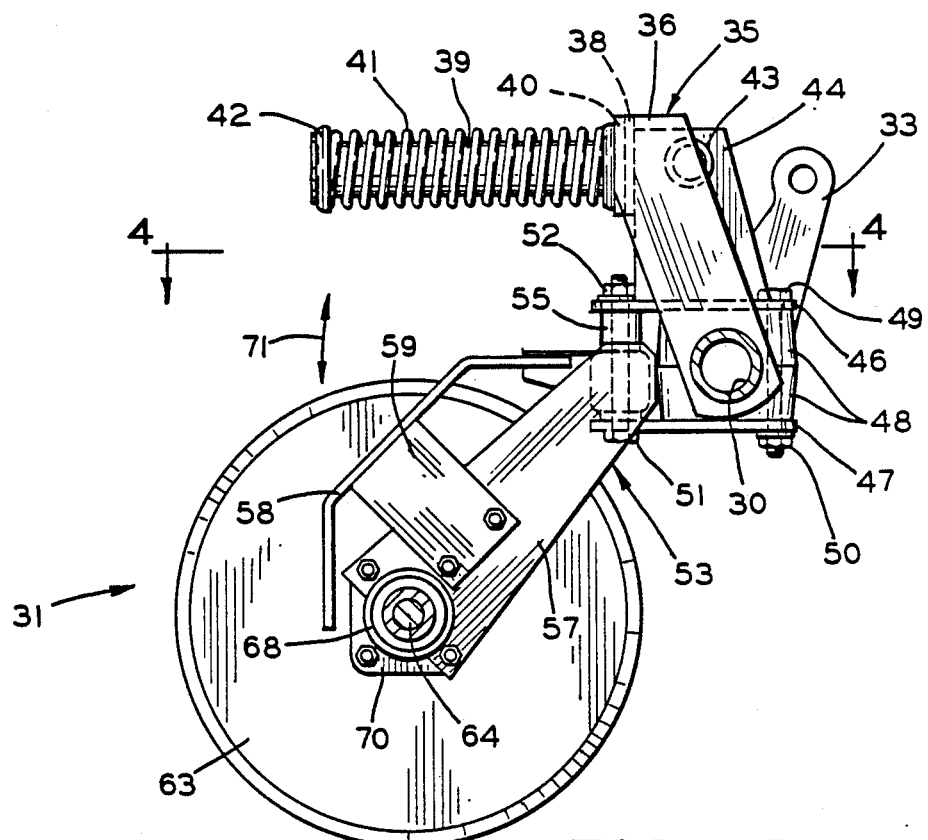
FIG. 3 is a cross sectional view of a disc gang taken along the line 3—3 in FIG. 2.
Figure 4:
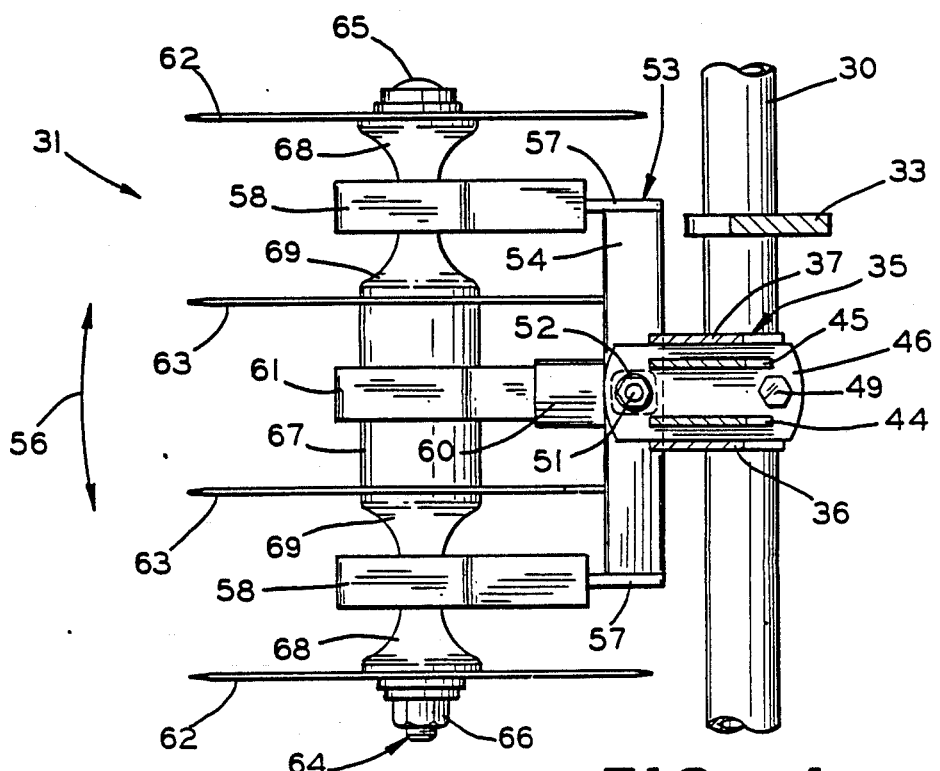
FIG. 4 is a cross sectional view taken along the line 4—4 in FIG. 3.

The disc gang 31 is shown in more detail in FIGS. 2-4. Each of the disc gangs 31 and 32 is provided with a mounting bracket 35 attached to the second rockshaft 30. The mounting bracket 35 is provided with a pair of spaced apart upstanding side walls 36 and 37 each having one end attached to the second rockshaft 30. A mounting plate 38 extends in a generally vertical direction between and is attached to the upper ends of the side walls 36 and 37. The plate 38 has a central aperture (not shown) formed therein for the passage of a rod 39 which is associated with the spring-type shock absorber as will be discussed below. Attached to the rearwardly facing surface of the mounting plate 38 is a ring 40 which cooperates with the mounting plate 38 to provide a seat for one end of a helical spring 41. The rod 39 extends through the center of the spring 41 and has a retainer cup 42 attached to one end thereof for providing a seat for the opposite end of the spring 41.

The other end of the rod 39 which extends through the mounting plate 38 has a pin 43 attached thereto with the longitudinal axis of the pin being perpendicular to the longitudinal axis of the rod 39. The ends of the pin 43 extend through apertures formed in a pair of generally vertically extending spaced apart parallel brackets 44 and 45. The lower ends of the brackets 44 and 45 are attached to a generally horizontally extending plate 46. The plate 46 is positioned above the second rockshaft 30 and extends substantially parallel to a lower plate 47 positioned below the rockshaft 30. Positioned between the plates 46 and 47 is a pair of bearing caps 48. The plates 46 and 47 and the bearing caps 48 are held together by bolts 49 and 51 extending through apertures formed in the plates 46 and 47 and the bearing caps 48 and secured by nuts 50 and 52 respectively.

A yoke 53 is attached between the plates 46 and 47 at the rear end thereof by the bolt 51 and the nut 52. The yoke 53 includes a generally horizontally extending box beam 54. A sleeve 55 is oriented with its longitudinal axis in a generally vertical direction and is mounted on a top surface in the central area of the box beam 54. The bolt 51 extends through apertures formed in the plates 46 and 47, the box beam 54 and the center of the sleeve 55. It can be seen that the box beam 54 is free to rotate about the vertical axis of the bolt 51 in the direction of an arrow 56 as shown in FIG. 4. One end of each of a pair of arms 57 is attached to a corresponding end of the box beam 54 and the arms extend downwardly and rearwardly. A pair of shields 58 are mounted above each of the arms 57 and each are attached to the arms by a bracket 59. At the center of the box beam 54, a rearwardly extending bracket 60 is attached which in turn is attached to a shield 61 similar to the shields 58.

A pair of outer discs 62 and a pair of inner discs 63 are rotatably attached to the yoke 53. An axle 64 has a head 65 formed at one end thereof and is threaded on the opposite end to receive a nut 66. The discs 62 and 63 are rotatably mounted on the axle 64 and are maintained in spaced apart relation by spools. For example, a first generally cylindrical spool 67 is positioned between the discs 63 at the center of the axle 64. A pair of half spools 68 and 69 are positioned between each of the adjacent pairs of discs 62 and 63. Between each pair of the half spools 68 and 69 is positioned the lower end of one of the arms 57 which has a cutout in the form of a half circle (not shown) formed therein for receiving the reduced diameter ends of the half spools. A mounting plate 70 with a complementary half circle cutout is attached to the arm 57 to rotatably attach the half spools 68 and 69 and the axle 64 to the arm 57.

In operation, the discs 62 and 63 are free to rotate about the longitudinal axis of the axle 64 as the implement 10 is moved across the field with the disc gangs 31 and 32 engaging the ground. When the implement 10 reaches the end of a row, the tractor and implement generally execute a one hundred eighty degree turn. Each of the disc gangs 31 and 32 is free to rotate about a vertical axis, such as the axis of the bolt 51, as such a turn is being made. In addition, each of the gangs is rotatably mounted on the rockshaft 40 by the bearing caps 48. Thus, when the discs 62 and 63 strike an object in the ground, they will rotate about the longitudinal axis of the rockshaft 30 as indicated by an arrow 71 in FIG. 3. The force tending to rotate the disc gang 31 in a clockwise direction about the rockshaft 30 will be absorbed in compressing the spring 41 as the rod 39 is pulled through the aperture in the mounting plate 38. As the spring 41 is compressed, the force is stored in the spring and is released after the disc gang clears the obstacle. The force is released by the extension of the spring 41 to rotate the disc gang 31 about the rockshaft 30 in a counterclockwise direction as shown by the arrow 71. Of course, the disc gang 31 will rotate with the rockshaft 30 when the arm 33 is rotated by the hydraulic cylinder 34 to raise or lower the disc gangs 31 and 32.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. In a farm implement having a frame adapted to carry tools, a rockshaft rotatably mounted on the frame and at least one disc gang attached to the rockshaft, the improvement comprising:
    a mounting bracket having one end attached to a rockshaft and extending radially from a longitudinal axis of the rockshaft;
    a spring means having one end coupled to an opposite end of said mounting bracket;
    a rod having one end coupled to an opposite end of said spring means;
    a bracket having one end rotatably attached to an opposite end of said rod and an opposite end rotatably attached to the rockshaft;
    a yoke mounted on said opposite end of said bracket for rotation about a generally vertical axis; and
    a plurality of discs rotatably attached to said yoke.

2. A farm implement according to claim 1 wherein said mounting bracket includes a pair of generally parallel side walls each having one end attached to the rockshaft and a mounting plate attached to an opposite end of each of said side walls for coupling to said one end of said spring means.

3. The farm implement according to claim 2 including a ring attached to said mounting plate and forming a seat for said one end of said spring means.

4. The implement according to claim 1 including a retainer cup attached to said one end of said rod for retaining said opposite end of said spring means.

5. The implement according to claim 1 wherein said spring means includes a helical spring and a longitudinal axis of said rod extends substantially parallel to a longitudinal axis of and through a center of said spring.

6. The implement according to claim 1 wherein said mounting bracket includes a pair of generally parallel extending side walls each having one end attached to said rockshaft, and a mounting plate attached between opposite ends of said side walls and having an aperture formed therein for receiving said opposite end of said rod.

7. The implement according to claim 1 wherein said bracket includes a pair of spaced apart generally parallel side walls each having an aperture formed therein and wherein said opposite end of said rod has a pin attached thereto whereby opposite ends of said pin are retained in said apertures in said side walls.

8. The implement according to claim 1 wherein said bracket has a pair of bearing caps attached to said opposite end and rotatably attached to the rockshaft.

9. The implement according to claim 8 wherein said bracket includes a pair of spaced apart generally parallel plates attached to said bearing caps and said yoke.

10. The implement according to claim 1 including at least three discs rotatably attached to said yoke.

11. An apparatus for mounting a disc gag on a rockshaft in a coulter chisel implement comprising:
spring means having one end coupled to a mounting bracket radially extending from a rockshaft and an opposite end coupled to one end of a bracket, an opposite end of said bracket being rotatably attached to the rockshaft by a pair of bearing caps rotatably mounted on the rockshaft and retained between a pair of plates fastened together by fasteners at least one of said fasteners adapted to rotatably mount said disc gang means attached to said bracket for mounting a disc gang for rotation about a generally vertical axis.

12. The apparatus according to claim 11 wherein said spring means includes a helical spring having one end coupled to said mounting bracket and an opposite end coupled to one end of a rod, said rod extending longitudinally through said helical spring and having an opposite end connected to said one end of said bracket.

13. The apparatus according to claim 12 wherein said opposite end of said rod has a pin attached thereto, opposite ends of said pin being rotatably retained by said bracket.

14. A disc gag for mounting on a rockshaft in a coulter chisel implement comprising:
a plurality of discs separated by spools and rotatably mounted on an axle;
a yoke having said axle rotatably attached thereto;
means for rotatably mounting said yoke for rotation about a generally vertical axis and adapted to be mounted on a rockshaft for rotation about a longitudinal axis of the rockshaft said means for rotatably mounting including a pair of bearing caps adapted to rotatably engage the rockshaft, said bearing caps being retained between a pair of generally parallel extending plates on ®of said spring means; and
spring means a having one end coupled to said means for rotatably mounting and an opposite end adapted to be coupled to a rockshaft.

15. A disc gang according to claim 14 wherein said means for rotatably mounting includes a bolt extending through apertures formed in said yoke.

16. The disc gang according to claim 14 wherein said spring means includes a helical spring having one end retained in a retainer cup and an opposite end adapted to be coupled to a rockshaft, said retainer cup being attached to a rod extending longitudinally through said spring and being rotatably attached to said means for rotatably mounting.

* * * * *